US012670911B2

(12) United States Patent
Kim et al.

(10) Patent No.: US 12,670,911 B2
(45) Date of Patent: Jun. 30, 2026

(54) DIALOGUE SYSTEM AND DIALOGUE PROCESSING METHOD

(71) Applicants: Hyundai Motor Company, Seoul (KR); Kia Corporation, Seoul (KR)

(72) Inventors: Sungwang Kim, Seoul (KR); Jaemin Moon, Yongin (KR); Minjae Park, Seongnam (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 569 days.

(21) Appl. No.: 18/081,382

(22) Filed: Dec. 14, 2022

(65) Prior Publication Data

US 2023/0206922 A1　Jun. 29, 2023

(30) Foreign Application Priority Data

Dec. 29, 2021　(KR) ........................ 10-2021-0191570

(51) Int. Cl.
| | |
|---|---|
| *G10L 15/26* | (2006.01) |
| *G06F 40/20* | (2020.01) |
| *G08B 3/10* | (2006.01) |
| *G08B 5/22* | (2006.01) |

(52) U.S. Cl.
CPC .............. *G10L 15/26* (2013.01); *G06F 40/20* (2020.01); *G08B 3/1008* (2013.01); *G08B 5/222* (2013.01)

(58) Field of Classification Search
CPC ................. G10L 15/26; G10L 15/1822; G10L 2015/223; G10L 15/22; G10L 15/04; G10L 15/183; G10L 15/063; G10L 15/1815; G10L 15/30; G10L 2015/225; G10L 2015/228; G06F 40/20; G06F 40/30; G06F 40/35; G06F 3/167; G08B 3/1008; G08B 5/222; B60R 16/0373; B60R 16/073

See application file for complete search history.

(56) References Cited

U.S. PATENT DOCUMENTS

| | | | | |
|---|---|---|---|---|
| 5,995,926 A | * | 11/1999 | Gupta | ............... H04M 3/42204 |
| | | | | 704/240 |
| 6,415,258 B1 | * | 7/2002 | Reynar | ................... G06F 3/167 |
| | | | | 704/E15.04 |
| 6,581,033 B1 | * | 6/2003 | Reynar | ................... G10L 15/22 |
| | | | | 704/E15.04 |
| 6,839,669 B1 | * | 1/2005 | Gould | ..................... G10L 15/22 |
| | | | | 704/E15.04 |

(Continued)

FOREIGN PATENT DOCUMENTS

| | | | | | |
|---|---|---|---|---|---|
| CN | 113505198 A | * | 10/2021 | ......... | G06F 16/3329 |
| JP | 2004-163265 A | | 6/2004 | | |

(Continued)

*Primary Examiner* — Thuykhanh Le
(74) *Attorney, Agent, or Firm* — Fox Rothschild LLP

(57) ABSTRACT

Provided is a dialogue system including: a speech recognizer module configured to convert a speech of a user into a plurality of candidate texts, and prioritize the plurality of candidate texts; a understanding module configured to determine a first action corresponding to a first candidate text with a highest priority among the plurality of candidate texts; and a controller configured to attempt to perform the determined first action, and when the first action is not performable, reprioritize other candidate texts of the plurality of candidate texts.

16 Claims, 15 Drawing Sheets

(56) References Cited

U.S. PATENT DOCUMENTS

| | | | | |
|---|---|---|---|---|
| 7,149,970 | B1* | 12/2006 | Pratley | G10L 15/22 704/E15.04 |
| 7,421,387 | B2* | 9/2008 | Godden | G10L 15/08 704/200 |
| 8,103,510 | B2 | 1/2012 | Sato | |
| 8,260,615 | B1* | 9/2012 | Nakajima | G10L 15/183 704/2 |
| 8,521,526 | B1* | 8/2013 | Lloyd | G06F 16/3344 704/251 |
| 8,566,102 | B1* | 10/2013 | Bangalore | G10L 15/22 704/270.1 |
| 9,043,208 | B2* | 5/2015 | Koch | G10L 15/30 704/251 |
| 9,412,374 | B2 | 8/2016 | Gruchalski et al. | |
| 9,576,578 | B1* | 2/2017 | Skobeltsyn | G10L 15/22 |
| 10,176,802 | B1* | 1/2019 | Ladhak | G10L 15/16 |
| 10,319,371 | B2 | 6/2019 | Zhao et al. | |
| 10,388,272 | B1* | 8/2019 | Thomson | G10L 15/22 |
| 10,453,117 | B1* | 10/2019 | Reavely | G06F 40/295 |
| 10,573,312 | B1* | 2/2020 | Thomson | G10L 15/22 |
| 10,713,570 | B1* | 7/2020 | Hazard | G06F 21/554 |
| 11,043,214 | B1* | 6/2021 | Hedayatnia | G10L 15/18 |
| 11,057,519 | B1* | 7/2021 | Miller | H04M 3/5175 |
| 11,081,104 | B1* | 8/2021 | Su | G06F 40/216 |
| 11,328,712 | B2* | 5/2022 | Ponniah | G10L 15/04 |
| 11,334,712 | B1* | 5/2022 | Nadig | G10L 15/22 |
| 11,574,637 | B1* | 2/2023 | Kumar | G10L 15/22 |
| 11,681,364 | B1* | 6/2023 | Zhang | G06N 3/0455 345/156 |
| 11,762,052 | B1* | 9/2023 | Ganguly | G01S 5/20 367/124 |
| 12,211,517 | B1* | 1/2025 | Maas | G06N 3/044 |
| 12,379,894 | B1* | 8/2025 | Raux | G06F 3/167 |
| 2002/0052742 | A1* | 5/2002 | Thrasher | G10L 15/26 704/251 |
| 2002/0156830 | A1* | 10/2002 | Gayama | H04L 67/52 704/E15.044 |
| 2003/0120486 | A1* | 6/2003 | Brittan | G10L 15/32 704/231 |
| 2004/0024601 | A1* | 2/2004 | Gopinath | G10L 15/22 704/E15.04 |
| 2008/0114597 | A1* | 5/2008 | Karpov | G10L 15/22 704/E15.04 |
| 2011/0288868 | A1* | 11/2011 | Lloyd | G10L 15/22 704/E15.001 |
| 2012/0016671 | A1* | 1/2012 | Jaggi | G10L 15/22 704/235 |
| 2013/0041685 | A1* | 2/2013 | Yegnanarayanan | G16H 50/20 705/2 |
| 2013/0268271 | A1* | 10/2013 | Osada | G10L 15/065 704/240 |
| 2013/0311506 | A1* | 11/2013 | Taubman | G06F 16/90335 707/769 |
| 2014/0358533 | A1* | 12/2014 | Kurata | G10L 15/08 704/231 |
| 2014/0372120 | A1* | 12/2014 | Harsham | G10L 15/08 704/251 |
| 2014/0372122 | A1* | 12/2014 | Harsham | G06F 3/16 704/257 |
| 2015/0199965 | A1 | 7/2015 | Leak et al. | |
| 2015/0242386 | A1* | 8/2015 | Moreno Mengibar | G06F 40/232 704/235 |
| 2015/0332673 | A1* | 11/2015 | Li | G06F 40/30 704/235 |
| 2015/0379993 | A1* | 12/2015 | Subhojit | G10L 15/065 704/275 |
| 2016/0275946 | A1* | 9/2016 | Caseiro | G06F 40/216 |
| 2016/0365092 | A1* | 12/2016 | Moreno Mengibar | G10L 15/197 |
| 2017/0025125 | A1* | 1/2017 | Alvarez Guevara | G10L 15/02 |
| 2017/0229124 | A1* | 8/2017 | Strohman | G10L 15/32 |
| 2017/0294190 | A1* | 10/2017 | Lindle | G10L 15/26 |
| 2018/0046851 | A1* | 2/2018 | Kienzle | B60K 35/235 |
| 2018/0233131 | A1* | 8/2018 | Aleksic | G10L 15/187 |
| 2018/0233152 | A1* | 8/2018 | Olaya | G10L 17/24 |
| 2018/0330723 | A1* | 11/2018 | Acero | G10L 15/30 |
| 2019/0013008 | A1* | 1/2019 | Kunitake | G10L 15/08 |
| 2019/0066659 | A1* | 2/2019 | Imai | G10L 15/063 |
| 2019/0126488 | A1* | 5/2019 | Sumiyoshi | G10L 15/22 |
| 2019/0340256 | A1* | 11/2019 | Kulkarni | G06F 16/24578 |
| 2020/0020325 | A1* | 1/2020 | Nam | G06F 16/322 |
| 2020/0135187 | A1* | 4/2020 | Chao | G10L 15/30 |
| 2020/0160838 | A1* | 5/2020 | Lee | G10L 15/183 |
| 2020/0175961 | A1* | 6/2020 | Thomson | G10L 15/06 |
| 2020/0243094 | A1* | 7/2020 | Thomson | G10L 15/28 |
| 2020/0258504 | A1* | 8/2020 | Lee | G10L 15/063 |
| 2020/0312312 | A1* | 10/2020 | Galustyan | G10L 15/02 |
| 2020/0320988 | A1* | 10/2020 | Rastogi | G10L 15/1815 |
| 2020/0342018 | A1* | 10/2020 | Lange | G06F 16/215 |
| 2020/0357412 | A1* | 11/2020 | Robert Jose | G10L 15/1815 |
| 2021/0012765 | A1* | 1/2021 | Weisz | G10L 15/1815 |
| 2021/0035564 | A1* | 2/2021 | Ogawa | G06N 5/046 |
| 2021/0104253 | A1* | 4/2021 | Jolly | G10L 25/60 |
| 2021/0142787 | A1* | 5/2021 | Kim | G10L 15/08 |
| 2022/0004870 | A1* | 1/2022 | Wang | G06N 3/048 |
| 2022/0068263 | A1* | 3/2022 | Roy | G06F 40/30 |
| 2022/0084505 | A1* | 3/2022 | Baharav | G06F 3/167 |
| 2022/0093101 | A1* | 3/2022 | Krishnan | G06V 40/20 |
| 2022/0293109 | A1* | 9/2022 | Sharifi | G10L 15/32 |
| 2022/0310081 | A1* | 9/2022 | Gaur | G10L 15/22 |
| 2022/0392432 | A1* | 12/2022 | Alphonso | G10L 15/01 |
| 2022/0399015 | A1* | 12/2022 | Klein | G06N 3/045 |
| 2022/0415315 | A1* | 12/2022 | Suzuki | G06F 40/279 |
| 2023/0022515 | A1* | 1/2023 | Aher | H04N 21/42203 |
| 2023/0050795 | A1* | 2/2023 | Moriya | G10L 15/005 |
| 2023/0068798 | A1* | 3/2023 | Etchart | G06T 7/74 |
| 2023/0115271 | A1* | 4/2023 | Wang | G10L 25/87 704/200 |
| 2023/0173657 | A1* | 6/2023 | Sharifi | G06V 20/50 701/23 |
| 2023/0186898 | A1* | 6/2023 | Weisz | G10L 15/30 704/257 |
| 2023/0298577 | A1* | 9/2023 | Yasa | G10L 15/22 704/200 |
| 2024/0185842 | A1* | 6/2024 | Assael | G10L 15/16 |

FOREIGN PATENT DOCUMENTS

| | | |
|---|---|---|
| JP | 2007-025076 A | 2/2007 |
| JP | 2008-242261 A | 10/2008 |
| KR | 101945190 B1 | 2/2019 |

* cited by examiner

DETERMINED AS NON-PLAYABLE

300

TRANSMISSION OF FAILURE SIGNAL

100

200

| | CANDIDATE TEXTS |
|---|---|
| 1 | *PLAY BTS'S DIET* |
| 2 | PLAY BTS'S DIAGRAM |
| 3 | PLAY BTS'S DYNAMITE |
| 4 | PLAY BTS'S DIA |

| | CANDIDATE TEXTS |
|---|---|
| 1 | *PLAY BTS'S DYNAMITE* |
| 2 | PLAY BTS'S DIAGRAM |
| 3 | PLAY BTS'S DIA |

REQUEST FOR PLAYBACK OF BTS'S DYNAMITE

DETERMINED AS PLAYABLE

FIG. 14

DIALOGUE SYSTEM AND DIALOGUE PROCESSING METHOD

CROSS-REFERENCE TO RELATED APPLICATION

This application claims under 35 U.S.C. § 119 the benefit of Korean Patent Application No. 10-2021-0191570, filed on Dec. 29, 2021, in the Korean Intellectual Property Office, the disclosure of which is incorporated herein by reference in its entirety.

BACKGROUND

Technical Field

Embodiments of the disclosure relate to a dialogue system and a dialogue processing method that may provide a service corresponding to a user's utterance.

Description of the Related Art

A dialogue system is capable of identifying what is intended by a user through dialogue with the user and providing a service corresponding to the identified user intention.

Recently, because such a dialogue system is provided in a vehicle, a user may control the vehicle, obtain desired information or be provided with desired services simply by user's utterance.

Meanwhile, errors in speech recognition may occur due to a user's incorrect pronunciation, in-vehicle noise, etc. To improve the utility of dialogue system, a technology capable of correcting such errors while minimizing an additional input of user when the error occurs is required.

SUMMARY

An aspect of the disclosure provides a dialogue system and a dialogue processing method that may determine whether an action corresponding to a speech recognition result is performable, and when the action is not performable, determine that misrecognition occurs, and reprioritize candidate speech texts, thereby correcting an error in speech recognition.

Also, an aspect of the disclosure provides a dialogue system and a dialogue processing method that may reprioritize candidate speech texts considering various factors such as a user's utterance frequency, entire users' utterance frequency, a matching rate in a domain, and completeness of sentence, and the like, thereby improving a likelihood of correction.

Also, an aspect of the disclosure provides a dialogue system and a dialogue processing method that may preemptively provide a user with a speech recognition result in which an error is corrected, thereby minimizing an additional input of the user.

Additional aspects of the disclosure will be set forth in part in the description which follows and, in part, will be obvious from the description, or may be learned by practice of the disclosure.

According to an embodiment of the disclosure, there is provided a dialogue system, including: a speech recognizer module configured to convert a speech of a user into a plurality of candidate texts, and prioritize the plurality of candidate texts; a understanding module in communication with the speech recognizer module, the understanding module being configured to determine a first action corresponding to a first candidate text having a highest priority from among the plurality of candidate texts; and a controller in communication with the speech recognizer module and the understanding module. The controller being configured to attempt to perform the determined first action, and if the first action is not performable, reprioritize other candidate texts of the plurality of candidate texts.

The dialogue system may further include a communicator, wherein the controller may be further configured to generate a first action signal for performing the determined first action, and the communicator is configured to transmit the generated first action signal to an external server or a vehicle.

If a failure signal indicating that an operation corresponding to the generated first action signal is not performable is received from the external server or the vehicle, the controller may be configured to reprioritize the other candidate texts.

The understanding module may be configured to determine a second action corresponding to a second candidate text having a highest priority among the reprioritized candidate texts.

The controller may be further configured to attempt to perform the determined second action, and if the second action is performable, generate a guide signal for providing the user with information about the second action.

The controller may be further configured to generate a visual guide signal for visually providing the information about the second action, if the user is looking at a display.

The controller may be further configured to generate an audible guide signal for audibly providing the information about the second action, if the user is not looking at a display.

The controller may be further configured to reprioritize the other candidate texts based on at least one of an utterance frequency of the user, an utterance frequency of entire users, a matching rate in a domain, and/or a completeness of a sentence.

The controller may be further configured to generate a visual guide signal for displaying an incorrect word which is misrecognized in the first candidate text and/or a corrected word which is correctly recognized in the second candidate text, and if a speech including the corrected word is input from the user, transmit a second action signal for performing the second action to the external server or the vehicle through the communicator.

The controller may be further configured to generate a visual guide signal for visually providing the information about the second action and an audible guide signal for audibly providing the information about the second action, and the communicator may be configured to transmit the visual guide signal and the audible guide signal to the vehicle.

According to an embodiment of the disclosure, there is provided a dialogue processing method including: converting a speech of a user into a plurality of candidate texts; prioritizing the plurality of candidate texts; determining a first action corresponding to a first candidate text having a highest priority from among the plurality of candidate texts; attempting to perform the determined first action, and reprioritizing other candidate texts of the plurality of candidate texts if the first action is not performable.

The dialogue processing method may further include: generating a first action signal for performing the determined first action; and transmitting the generated first action signal to an external server or a vehicle.

If a failure signal indicating that an operation corresponding to the generated first action signal is not performable is received from the external server or the vehicle, the reprioritizing may include reprioritizing the other candidate texts.

The dialogue processing method may further include: determining a second action corresponding to a second candidate text having a highest priority among the reprioritized candidate texts.

The dialogue processing method may further include: attempting to perform the determined second action; and generating a guide signal for providing the user with information about the second action if the second action is performable.

The generating of the guide signal step may include generating a visual guide signal for visually providing the information about the second action, if the user is looking at a display.

The generating of the guide signal step may include generating an audible guide signal for audibly providing the information about the second action, if the user is not looking at a display.

The reprioritizing step may include reprioritizing the other candidate texts based on at least one of an utterance frequency of the user, an utterance frequency of entire users, a matching rate in a domain, or a completeness of a sentence.

The generating of the guide signal step may include generating a visual guide signal for displaying a word which is misrecognized in the first candidate text and corrected in the second candidate text, and if a speech including the corrected word is input from the user, transmitting a second action signal for performing the second action to the external server or the vehicle.

The generating of the guide signal step may include generating a visual guide signal for visually providing the information about the second action and an audible guide signal for audibly providing the information about the second action, and transmitting the visual guide signal and the audible guide signal to the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram illustrating a dialogue system according to an embodiment;

FIG. 6 is a diagram illustrating an example of a processing procedure in a dialogue processing method illustrated in FIG. 5;

FIGS. 13 to 15 are diagrams illustrating examples of a processing procedure of a dialogue processing method according to an embodiment.

DETAILED DESCRIPTION

Figure 2:
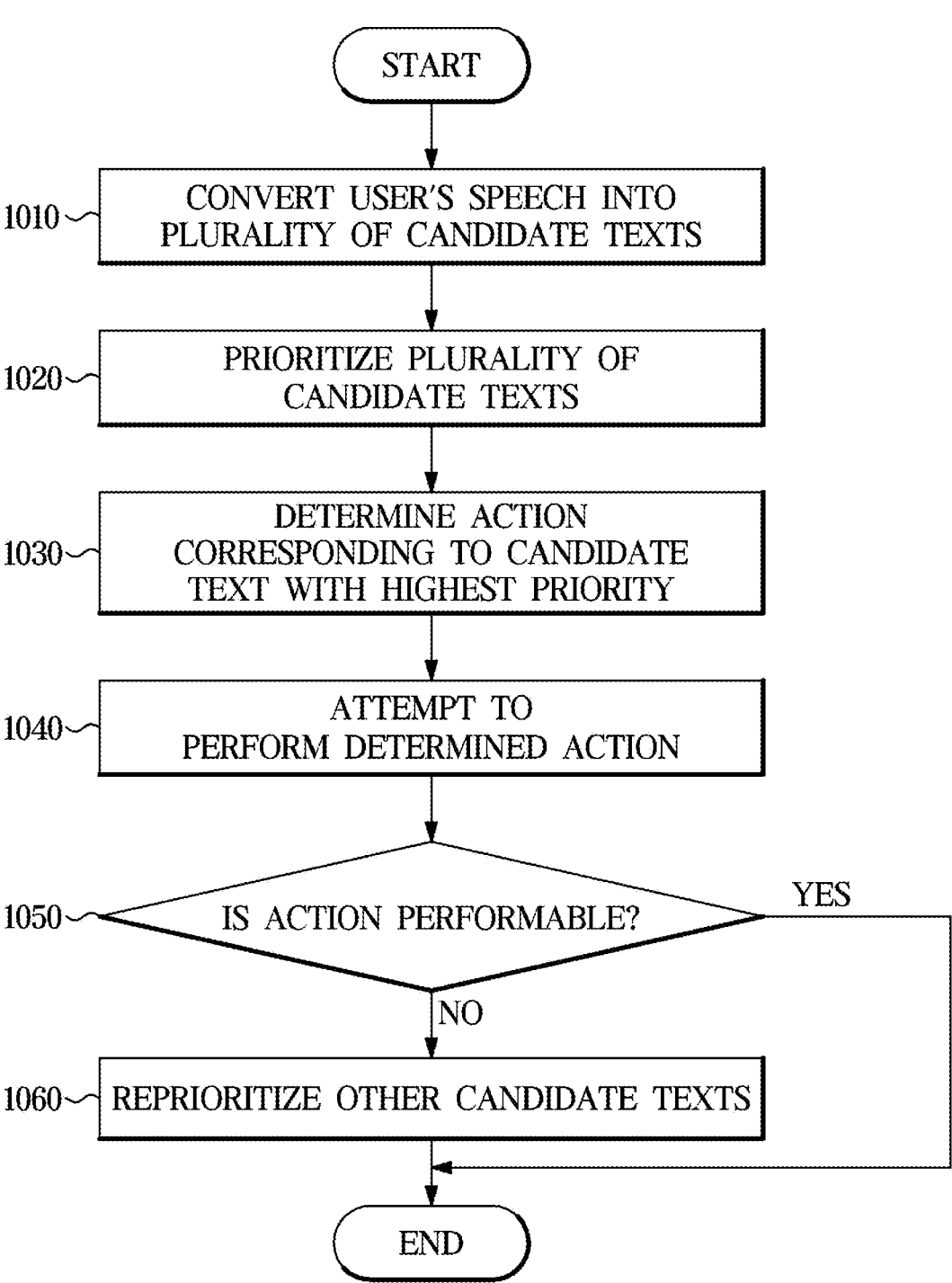
FIG. 2 is a flowchart illustrating a dialogue processing method according to an embodiment.

The embodiments set forth herein and illustrated in the configuration of the disclosure are only preferred embodiments, so it should be understood that they may be replaced with various equivalents and modifications at the time of the disclosure.

Like reference numerals throughout the specification denote like elements.

Terminologies used herein are for the purpose of describing particular embodiments only and is not intended to limit the disclosure. It is to be understood that the singular forms are intended to include the plural forms as well, unless the context clearly dictates otherwise.

It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. For example, without departing from the technical spirit or essential features of the disclosure, a first element may be referred to as a second element, and also a second element may be referred to as a first element.

Descriptions shall be understood as to include any and all combinations of one or more of the associated listed items when the items are described by using the conjunctive term "~and/or~", or the like.

Further, the terms such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, embodiments of the disclosure will be described in detail with reference to the accompanying drawings.

Figure 1:
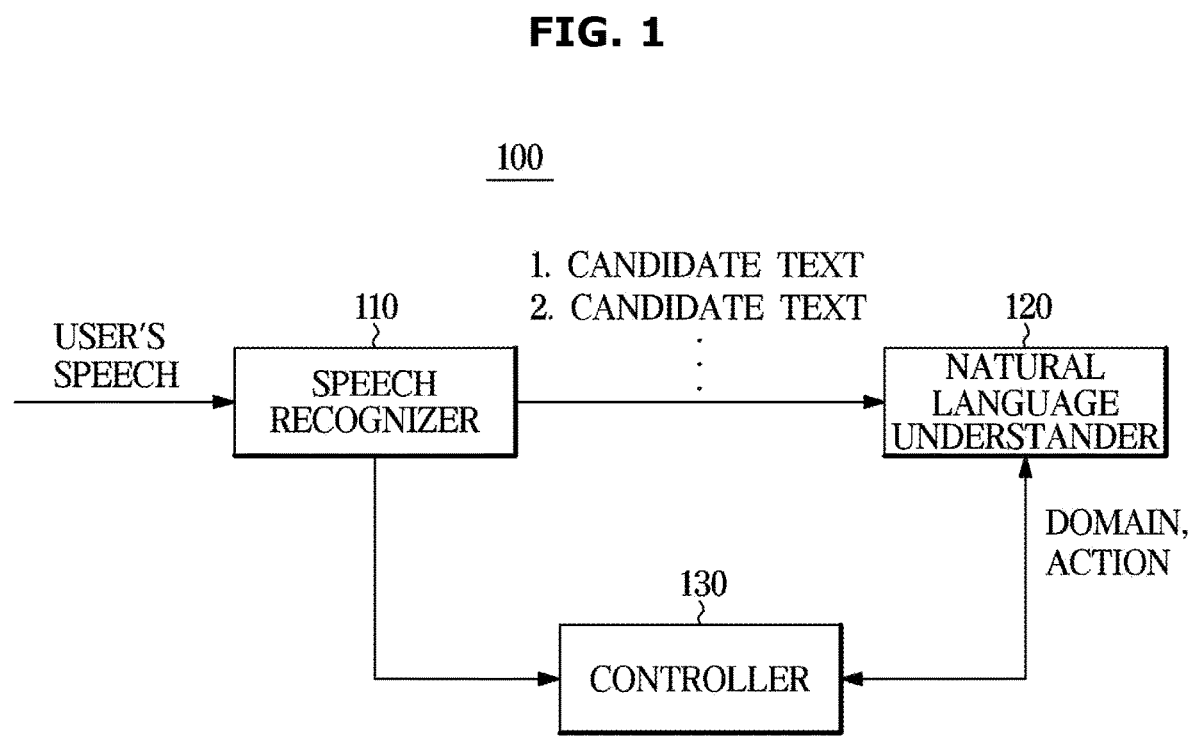

FIG. 1 is a block diagram illustrating a dialogue system according to an embodiment. FIG. 2 is a flowchart illustrating a dialogue processing method according to an embodiment.

According to an embodiment, a dialogue system refers to a system recognizing and understanding a user's speech and providing a service corresponding to the user's speech. A dialogue processing method according to an embodiment may be performed by the dialogue system according to an embodiment. Accordingly, despite not being stated, all or a portion of operations of the dialogue processing method may be performed by constituent components of the dialogue system, and all or a portion of operations performed by the dialogue system may be included in the dialogue processing method.

Referring to FIG. 1, a dialogue system 100 according to an embodiment includes a speech recognizer module 110, a understanding module 120 and a controller 130. Here, the speech recognizer module 110 converts a user's speech into text, the understanding module 120 determines a user intention corresponding to the user's speech and the controller 130 generates an action signal for performing a control corresponding to the user intention.

The speech recognizer module 110 may be implemented with a speech to text (STT) engine, and perform conversion into text by applying a speech recognition algorithm to the user's speech.

For example, the speech recognizer module 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognizer module 110 may convert the user's speech into the text based on learning where deep learning or machine learning is applied. According to the embodiment, a way of converting the user's speech into the text by the speech recognizer module 110 is not limited thereto, and a variety of speech recognition techniques may be applied to convert the user's speech into the text.

The speech recognizer module 110 may calculate a confidence score to secure reliability of recognition result. The confidence score is a measure of how reliable a speech recognition result is.

For example, with respect to a phoneme or word which is a recognized result, the confidence score may be defined as a relative value of a probability that the utterance is made from another phoneme or word. Accordingly, the confidence score may be expressed as a value between 0 and 1, or a value between 0 and 100.

When a confidence score of a recognition result is greater than a preset threshold value, the recognition result may be accepted, and when the confidence score of the recognition result is smaller than the preset threshold value, the recognition result may be rejected.

The recognition result of the speech recognizer module 110, i.e., the text converted from the user's speech, may be input to the understanding module 120. The understanding module 120 may apply a natural language understanding (NLU) technique to determine user intention included in the input text. Accordingly, the understanding module 120 may include an NLU engine that determines the user intention by applying the NLU technique to an input text.

For instance, the understanding module 120 may recognize an entity name from the input text. The entity name is a proper noun such as a name of an individual person, place, organization, time, day, currency, and the like. Named-entity recognition is for identifying an entity name in a sentence and classifying a type of the identified entity. A keyword may be extracted from a sentence through named-entity recognition to understand the meaning of the sentence.

Also, the understanding module 120 may determine a domain from the input text. The domain may be for identifying a subject of the user's speech. For example, domains representing various subjects such as schedule, information about weather or traffic conditions, text transmission, entertainment, making a call, navigation, vehicle control, home appliance control, etc., may be determined based on the input text.

In addition, the understanding module 120 may analyze a speech act of the input text. Speech act analysis is for analyzing an intention of speech, such as whether the user asks a question, makes a request, responds, or simply expresses the user's emotions.

The understanding module 120 may determine an intent and an entity required to perform the intent based on the domain, entity name, speech act extracted from the input text.

For example, when the input text is "turn on the air conditioner", the domain may be [vehicle control] and the intent may be [turn on, air conditioner]. Also, the entity required to perform control corresponding to such intent may be [temperature, air volume].

As another example, when the input text is "play a song", the domain may be [entertainment], the intent may be [play, song], and the entity required to perform control corresponding to such intent may be [singer, song name].

An operation finally performed in response to the user's speech may be defined by an intent and an entity, and in the embodiment, the operation defined by the intent and the entity is referred to as an action.

However, classification criteria, names, etc., of a domain and an intent may vary depending on a system. Accordingly, terms different from the terms used in the embodiment may also be encompassed by a scope of the disclosure, as long as the terms have the same meaning and use.

The controller 130 may generate an action signal for performing an action corresponding to the user intention and transmit the generated action signal to an object performing the corresponding action.

Depending on an implementation of the dialogue system 100, the action signal may be transmitted to the object performing the corresponding action directly, or transmitted through another constituent component. When the object performing the corresponding action is located remotely, the action signal may be transmitted through a communicator.

For example, when an action corresponding to a user intention is a vehicle-related control, a control signal for performing the corresponding control is an action signal, and the dialogue system 100 may generate the action signal and transmit to a vehicle.

Alternatively, when an action corresponding to a user intention is provision of specific information, a signal for requesting for retrieval of the corresponding information may be an action signal, and the dialogue system 100 may transmit the action signal to an external server capable of searching for the corresponding information.

Alternatively, when an action corresponding to a user intention is provision of specific content, a signal for requesting the corresponding content may be an action signal, and the dialogue system 100 may transmit the action signal to an external server providing the content.

Alternatively, when an action corresponding to a user intention is simply continuation of a dialogue, a response signal to a user's speech may be an action signal.

The above-described dialogue system 100 may be implemented with at least one memory storing at least one program performing the aforementioned operations and at least one processor implementing a stored program. In at least one embodiment, the memory is configured to store computer executable code that may be fixed, continuously updated over time, and/or trained according to various machine learning techniques, e.g., Supervised Learning, Unsupervised Learning, Semi-supervised Learning, and Reinforcement Learning. Such techniques may implement a corresponding machine learning algorithm, e.g., Linear regression, Logistic regression, Decision tree, SVM algorithm, Naive Bayes algorithm, KNN algorithm, K-means, Random Forest algorithm, Dimensionality reduction algorithms, Gradient boosting algorithm and Ada Boosting algorithm. The processor may be configured to selectively execute aspects of the computer executable code to perform one or more processes upon a defined event, a user request, and in some cases independently without user input.

The control logic of the present disclosure may be embodied as a computer readable media on a computer readable medium (e.g., a "memory storage") containing data including computer executable program instructions that may be selectively executed by a processor, controller, module, unit, or the like. In some embodiments the data and/or instructions may also be distributed in network coupled computer systems in a distributed fashion, e.g., by a networked client-server system, a telematics server, and/or a Controller Area Network (CAN).

In some embodiments, separate programs, and the supporting electronic hardware to execute those programs, may be individually referred to as a "module" to effectively explain and enable the disclosed embodiments. In some instances, a module may be specifically named and/or include a descriptive label corresponding to the type or function of said module. The plural usage "modules" may refer to at least one module e.g., a first module, second module, etc. It shall be understood that the exemplary processes may be performed by a single module/unit/controller or a plurality of modules/units/controllers that may share a computing resources and structure or where each has its own dedicated computing resources and structure, e.g., a dedicated supporting memory, dedicated processor, power supply, etc. as a person of ordinary skill in the art would understand to be consistent with the disclosure herein.

Example corresponding structure of, a "module," "unit," and/or "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. The module/unit/controller may optionally include: antennas, network interfaces that provide wireless and/or wire line digital and/or analog interface to one or more networks over one or more network connections, a power source that provides an appropriate alternating current (AC) or direct current (DC) power source, and a bus that allows communication among the various disclosed components.

As explained below, the constituent components of the dialogue system 100 are divided based on their operation or function, and all or a portion of the constituent components may share the memory or processor.

Also, the dialogue system 100 may be implemented with a server including at least one memory and at least one processor. Alternatively, a portion of functions of the dialogue system 100 may be performed in a user terminal such as a vehicle, a mobile device, and the like, and the dialogue system 100 itself may be equipped with a user terminal.

Hereinafter, embodiments of the dialogue system 100 and the dialogue processing method are described in detail with reference to FIG. 2.

According to the embodiment of the dialogue processing method shown in FIG. 2, the speech recognizer module 110 may convert a user's speech into a plurality of candidate texts (1010), and prioritize the plurality of candidate texts (1020).

As described above, the speech recognizer module 110 converts the user's speech into text. In this instance, speech recognizer module 110 may convert the user's speech into the plurality of candidate texts that may match the user's speech, not a single text.

The speech recognizer module 110 may output an N number of texts as a candidate text using an N-best search algorithm. For example, the N number of candidate texts may be prioritized based on a confidence score described above. The higher the confidence score, the higher a priority may be. Also, only candidate texts having a confidence score greater than or equal to a threshold value may be output.

The understanding module 120 determines an action corresponding to a candidate text with a highest priority (1030). Alternatively, according to a modification of the embodiment, actions corresponding to the N number of candidate texts may be determined in advance.

As described above, the understanding module 120 may recognize a domain, intent, entity, etc., from the input candidate texts to determine an action corresponding thereto. The action may be determined by an intent and entity.

The controller 130 may attempt to perform the determined action (1040), and when the action is not performable (No in operation 1050), reprioritize the other candidate texts among the plurality of candidate texts (1060), which is described in greater detail later.

Also, when the action is not performable (No in operation 1050), the controller 130 may visually or audibly output a message notifying a user that the action is not performable.

It is illustrated in the flowchart of FIG. 2 that a corresponding processing ends when the action is performable (Yes in operation 1050). That is, when the action is performable, processing related to prioritization ends, and the action may be performed according to a general processing procedure.

Figure 3:
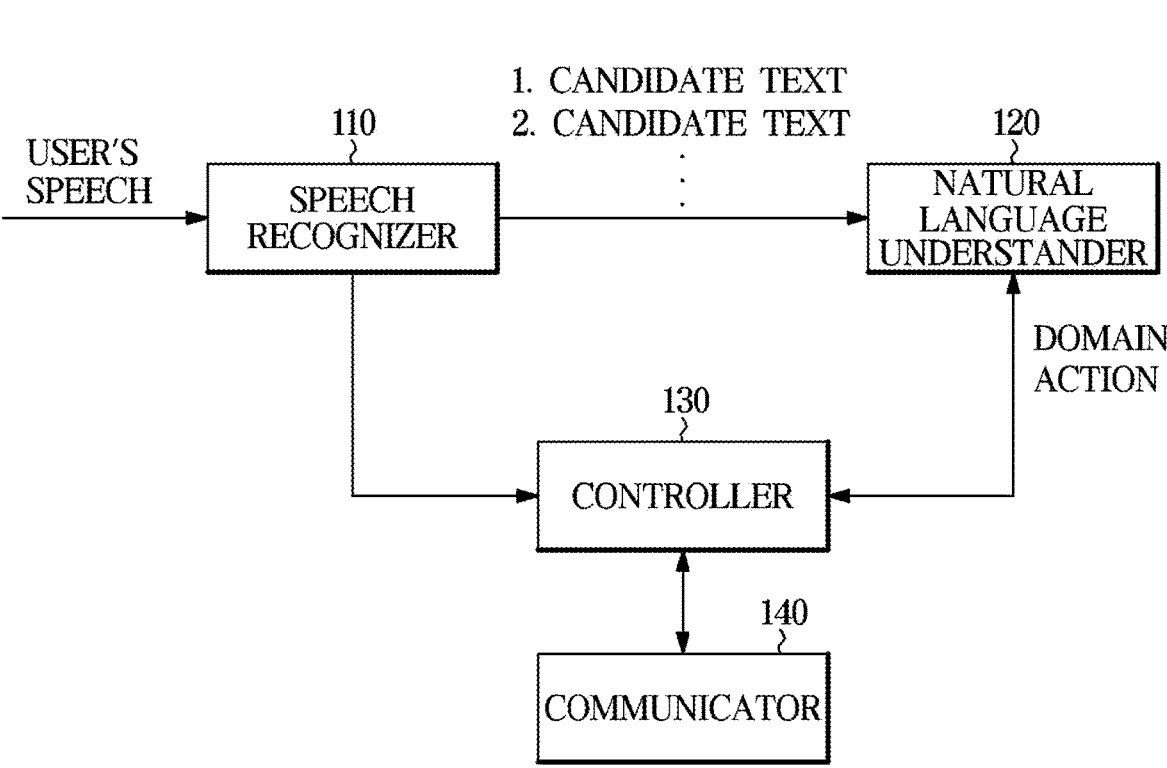
FIG. 3 is another block diagram illustrating a dialogue system according to an embodiment.
Figure 4:
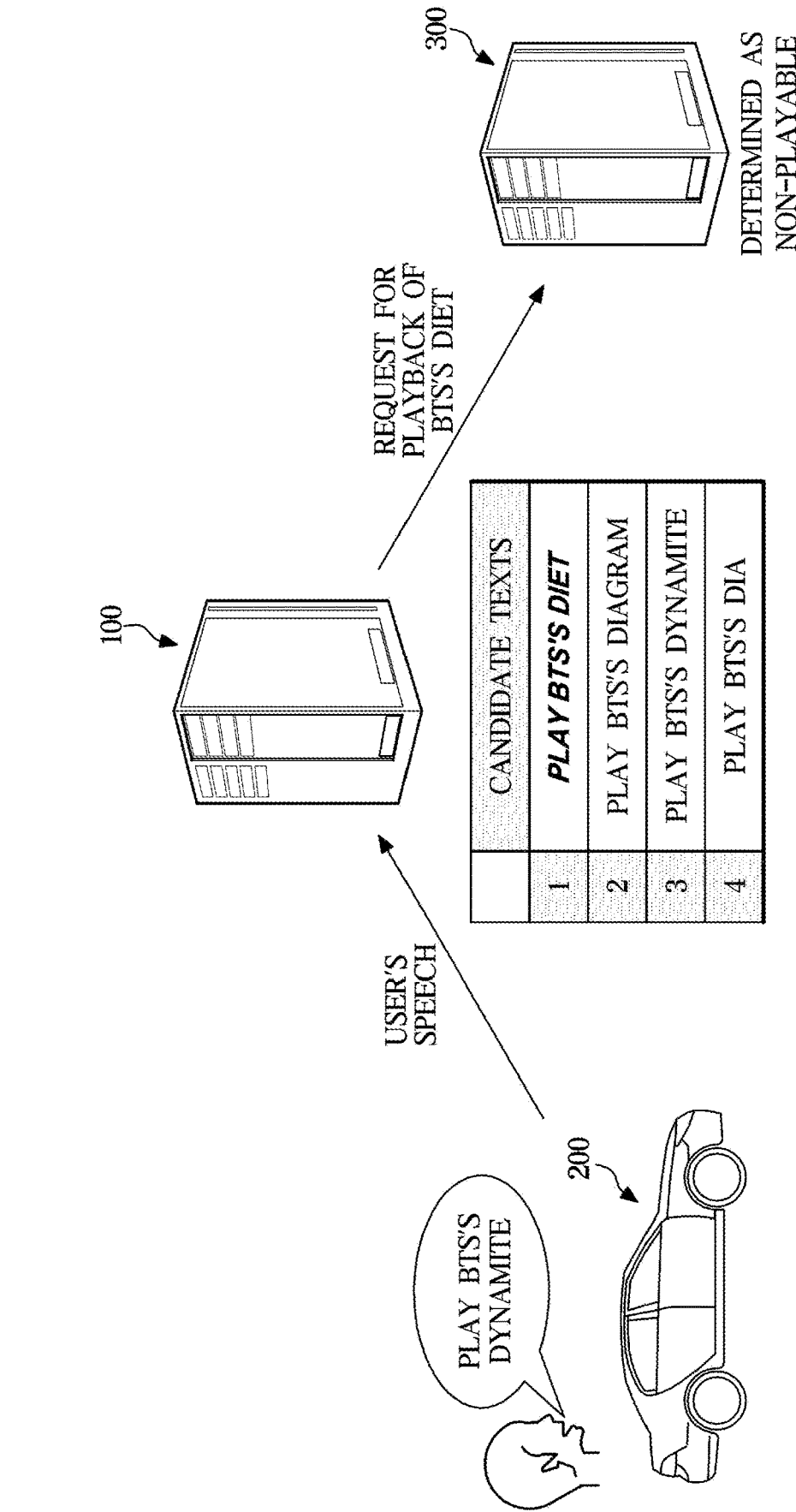
FIG. 4 is a diagram illustrating an example of operations of a dialogue processing method according to an embodiment.

FIG. 3 is another block diagram illustrating a dialogue system according to an embodiment. FIG. 4 is a diagram illustrating an example of operations of a dialogue processing method according to an embodiment.

Referring to FIG. 3, the dialogue system 100 according to an embodiment may further include a communicator 140, e.g., an antenna, optic, shortwave radio or longwave radio capable of being configured to send and receive communications.

When the dialogue system 100 is implemented with a separate server, the communicator 140 may use various wireless communication methods to transmit and receive information with a user terminal or an external server. For example, the communicator 140 may employ at least one of various wireless communication methods such as 3G (WCDMA/HSDPA/wibro), 4G (LTE/LTE-A), 5G, Wi-Fi, and the like.

In the example of FIG. 4, it is illustrated that the dialogue system 100 is implemented with a separate server and a vehicle 200 functions as a user terminal or a gateway providing a user with an input/output interface.

As shown in FIG. 4, when a user in the vehicle 200 inputs a speech, "play BTS's dynamite", the input user's speech may be transmitted to the dialogue system 100.

Specifically, the communicator 140 of the dialogue system 100 may receive the user's speech and the speech recognizer module 110 may convert the user's speech into a plurality of candidate texts.

For example, as shown in FIG. 4, the speech recognizer module 110 may output four candidate texts. Because a candidate text with a highest priority (priority: 1) among the four candidate texts is "play BTS's diet", the understanding module 120 may determine that an action corresponding to the user's speech is to play a song named "diet" of a singer named "BTS". Here, an intent may be defined as [music, playback], and an entity may be defined as [singer: BTS, song name: diet].

To attempt to perform the determined action, the controller 130 may request playback of "diet" by "BTS" from an external server 300 that provides music streaming or music file download service.

Figure 5:
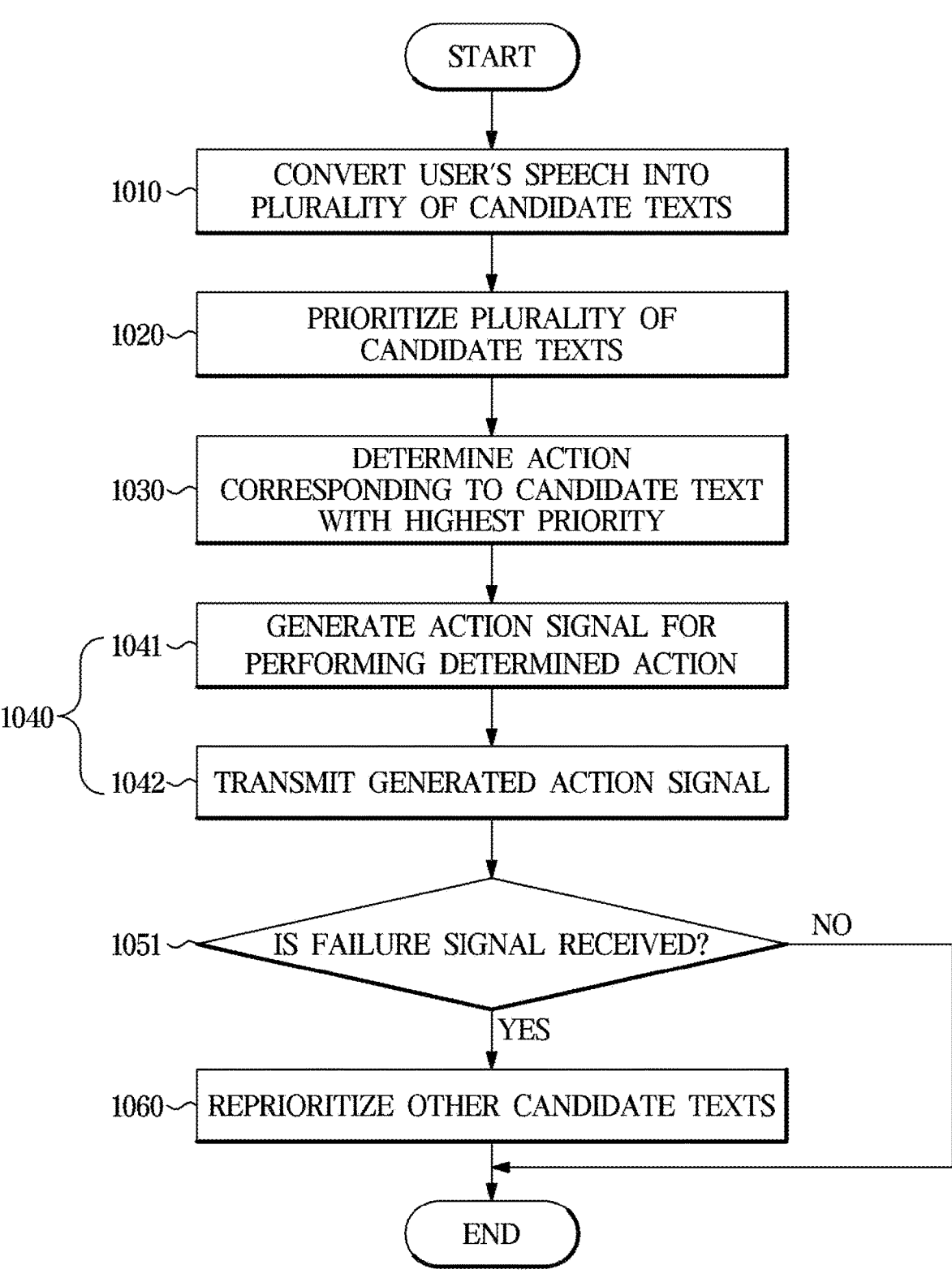
FIG. 5 is a flowchart illustrating specific operations of attempting to perform an action, in a dialogue processing method according to an embodiment.

FIG. 5 is a flowchart illustrating specific operations of attempting to perform an action, in a dialogue processing method according to an embodiment. FIG. 6 is a diagram illustrating an example of a processing procedure of a dialogue processing method illustrated in FIG. 5.

Referring to FIG. 5, attempting to perform the determined action (1040) may include generating an action signal for performing the corresponding action (1041) and transmitting the generated action signal to a subject performing the corresponding action (1042).

For example, when the determined action is a vehicle-related control such as an air conditioning control or a seat control, the controller 130 may generate an action signal for controlling the vehicle.

Alternatively, when the determined action is playback of a specific song like the example of FIG. 4, the controller 130 may generate an action signal for requesting playback of the corresponding song from the external server 300.

Detailed description is made by applying the example of FIG. 4. The external server 300 receiving the request for playback of BTS's diet may search for a song named "diet" of a singer named "BTS".

As shown in FIG. 6, when failing to retrieve "diet" by "BTS", the external server 300 may transmit a failure signal to the dialogue system 100.

When the communicator 140 receives the failure signal from the external server 300 (Yes in operation 1051), indicating that the action is not performable, and thus, the other candidate texts are reprioritized (1060).

Also, when the action is not performable, a guide signal notifying the user that the action is not performable may be output visually or audibly. To this end, the controller 130 may generate a visual guide signal or audible guide signal and transmit the generated guide signal to a user terminal, e.g., the vehicle 200, through the communicator 140.

Referring to FIG. 6, the controller 130 may reprioritize the remaining three candidate texts, except for the candidate text with the highest priority, "play BTS's diet".

The remaining candidate texts may be reprioritized considering various factors. For example, priorities may be adjusted based on at least one of a utterance frequency of the corresponding user, a utterance frequency of entire users, a matching rate in a domain, or a completeness of a sentence.

With respect to the utterance frequency of the corresponding user, a high priority may be provided to a candidate text including a sentence or a word with a high utterance frequency of the corresponding user, among the remaining candidate texts.

With respect to the utterance frequency of the entire users, a high priority may be provided to a candidate text including a sentence or a word with a high utterance frequency of all the users of the dialogue system 100 including the corresponding user.

With respect to the matching rate in a domain, a high priority may be provided to a candidate text including a word having a high matching rate with a domain corresponding to a corresponding candidate text among the plurality of candidate texts.

For example, when a domain is [entertainment], a high priority may be provided to a candidate text including a singer's name, song name, drama's title, actor's name, etc. The words in the above example may be recognized through named-entity recognition. However, singer's name, actor's name, song name, film's title, etc., which are not registered in a named-entity dictionary, may exist.

As another example, when a domain is [vehicle control], a high priority may be provided to a candidate text including terminologies related to a vehicle control.

With respect to the completeness of a sentence, a high priority may be provided to a candidate text with a proper and natural sentence structure. For example, a priority may be provided based on an order of a subject, object and verb, or appropriateness of words positioned in a subject, object and verb. Alternatively, a priority may be provided based on appropriateness of relationship between a verb and an object, a relationship between a subject and a verb, and a relationship between a subject and an object.

The controller 130 may adjust priorities, based on one of the above factors or by providing a weight to each of two or more factors.

However, in the embodiments of the dialogue processing method or the dialogue system 100, factors to be considered when reprioritizing are not limited to the above examples. Any factors that may be considered to obtain an optimal recognition result matching a user's speech may be used for reprioritizing in the embodiment.

In the example of FIG. 6, final scores of candidate texts may be calculated based on a completeness of a sentence, utterance frequency of the corresponding user, utterance frequency of entire users, and whether an action is performable, as set out in the table 1 below. For example, the final score may be obtained by multiplying each score, without being limited thereto.

TABLE 1

|  | completeness of a sentence | utterance frequency of a user | utterance frequency of entire users | whether an action is performable | final score |
|---|---|---|---|---|---|
| Play BTS's diagram | 0.3 | 0.1 | 0.1 | 0.1 | 0.0003 |
| Play BTS's dynamite | 1.0 | 0.7 | 1.0 | 1.0 | 0.7 |
| Play BTS's dia | 0.9 | 0.1 | 0.1 | 1.0 | 0.27 |

Priorities may be adjusted according to the final scores, and a highest priority may be provided to a candidate text with the highest final score as a result of reprioritizing, "Play BTS's dynamite".

Meanwhile, in the above example, whether an action is performable has been added to the factors considered for reprioritizing. In this case, whether an action corresponding to each of the plurality of candidate texts is performable may be determined in advance and a result of determination may be stored. For example, during an operation of initially determining whether an action corresponding to a candidate text with a highest priority is performable, whether an action corresponding to each of the other candidate texts is performable may also be determined together.

Figure 7:
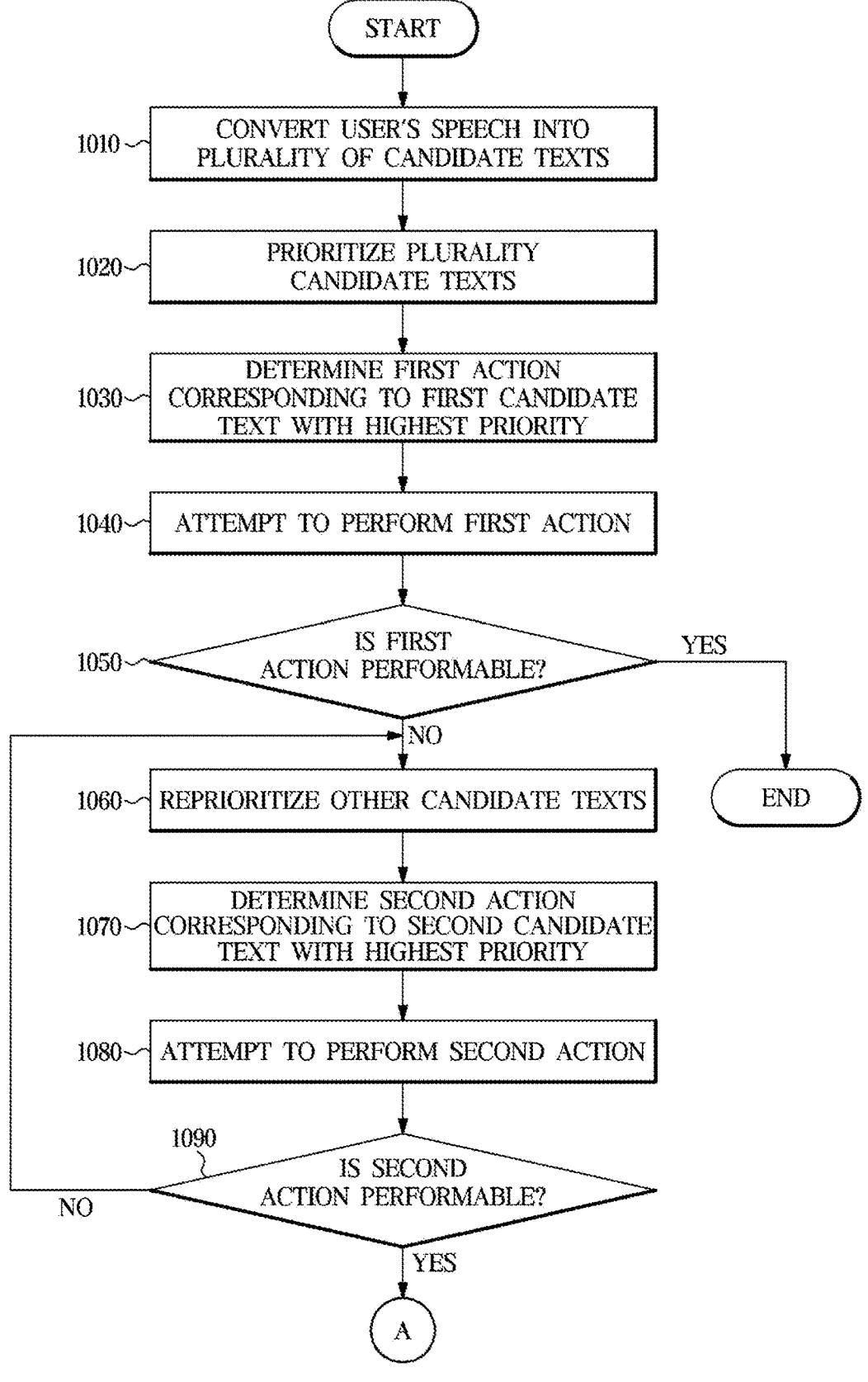
FIGS. 7 and 8 are flowcharts illustrating operations after reprioritizing, in a dialogue processing method according to an embodiment.
Figure 8:
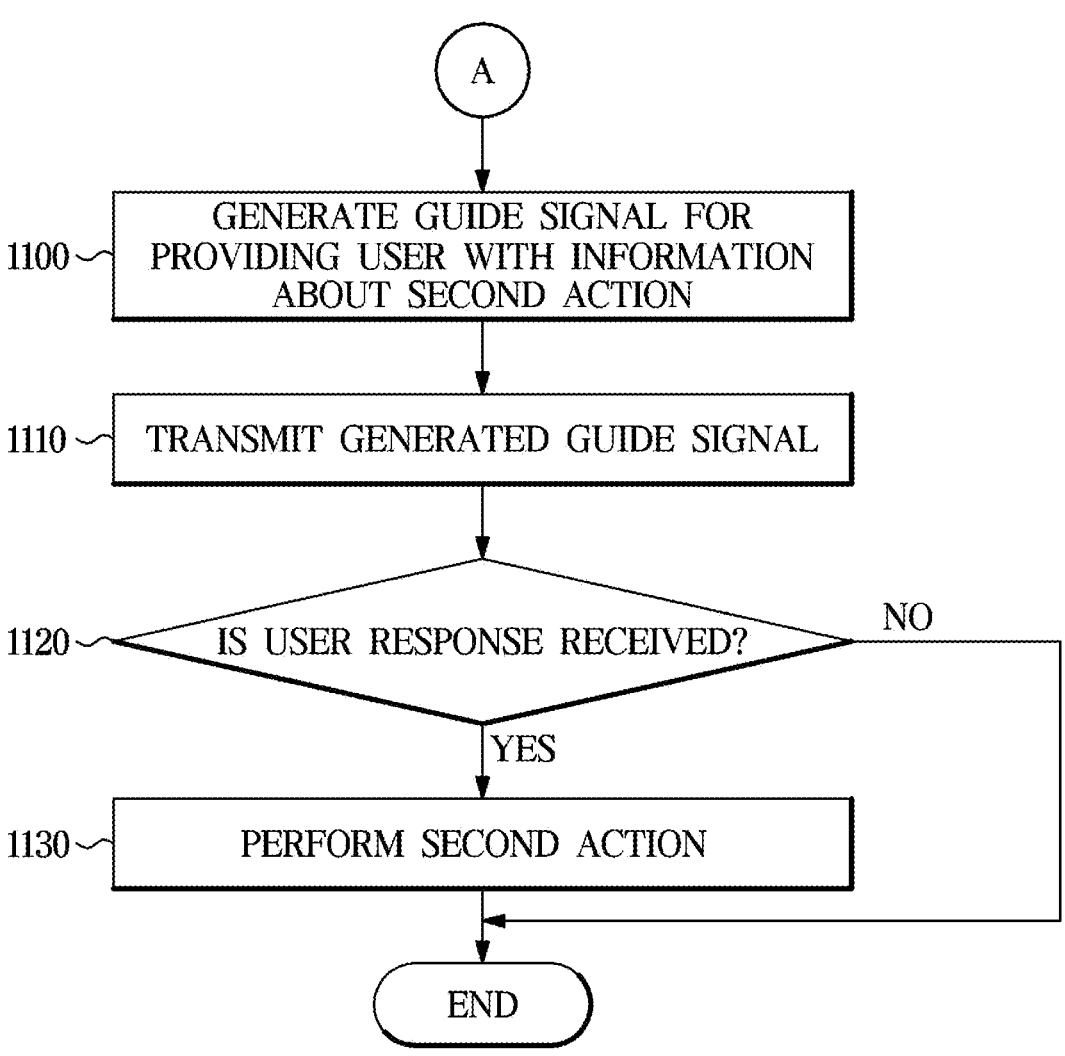
Figure 9:
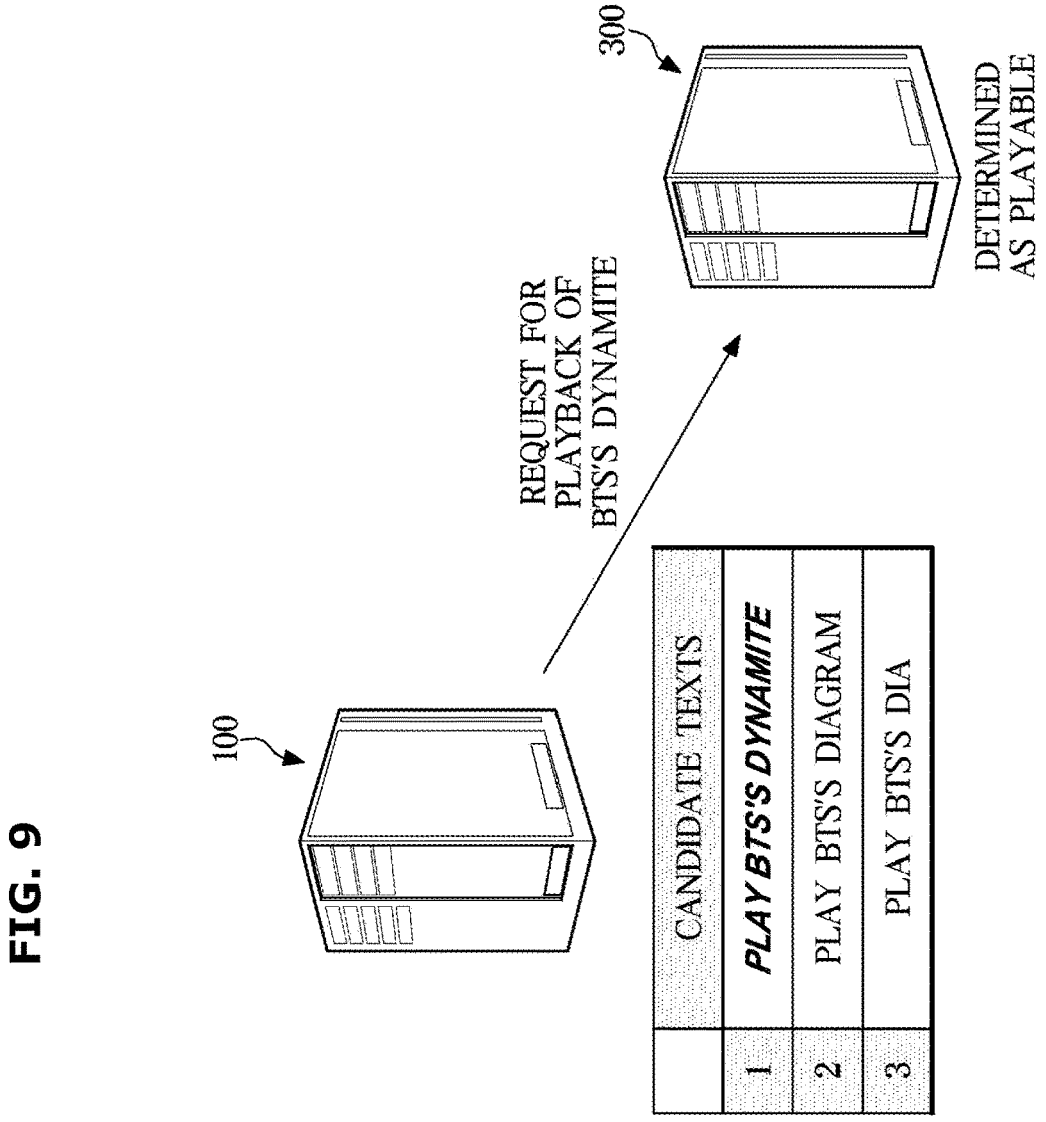
FIGS. 9 and 10 are diagrams illustrating examples of operations of a dialogue processing method illustrated in FIGS. 7 and 8.
Figure 10:
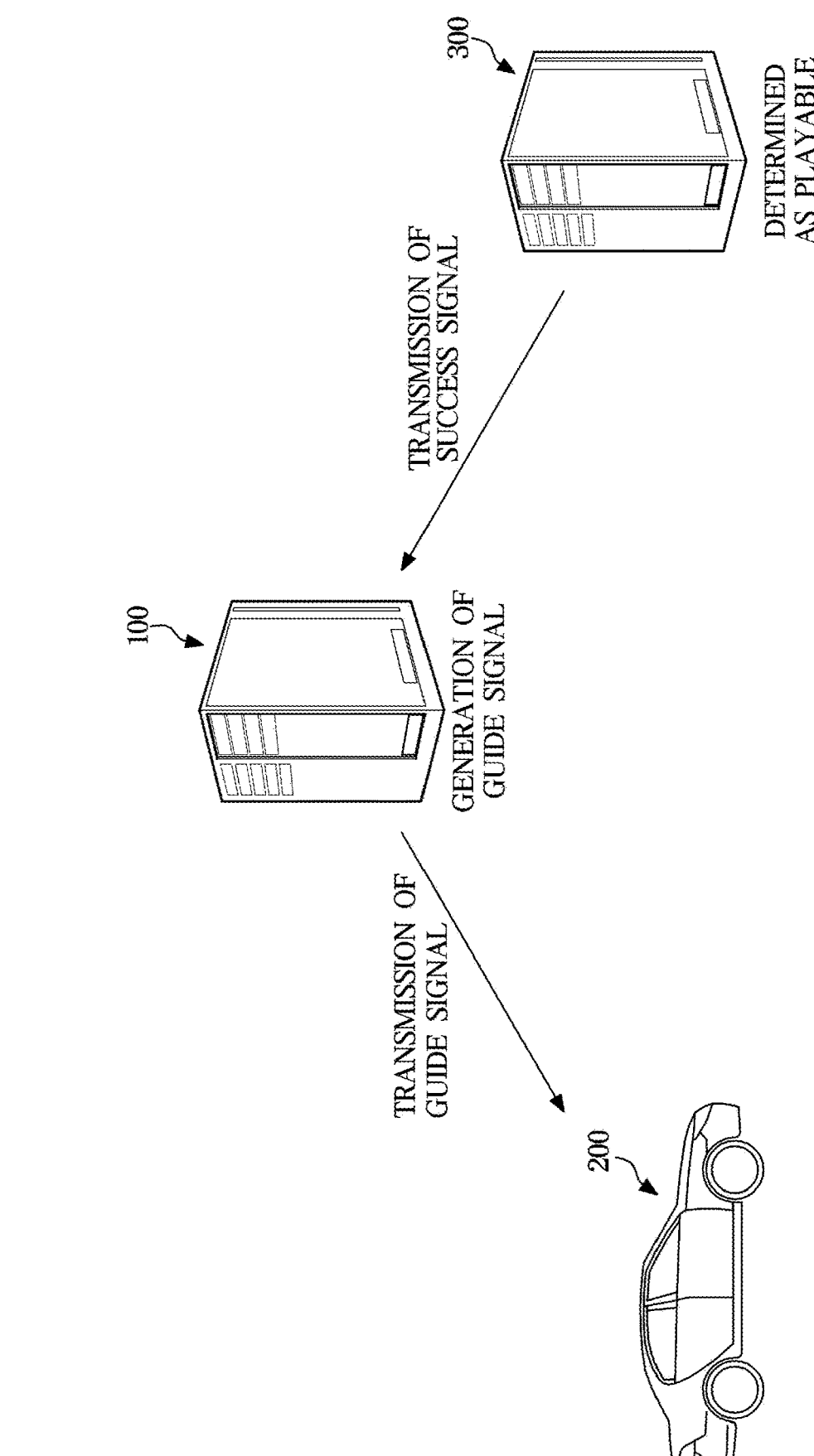

FIGS. 7 and 8 are flowcharts illustrating operations after reprioritizing, in a dialogue processing method according to an embodiment. FIGS. 9 and 10 are diagrams illustrating examples of operations of a dialogue processing method illustrated in FIGS. 7 and 8.

Referring to FIG. 7, when the other candidate texts are reprioritized (1060), the controller 130 determines an action corresponding to a candidate text with a highest priority after reprioritizing (1070).

To distinguish an initial recognition result from a recognition result after reprioritizing, a candidate text with the highest priority in the initial recognition result is referred to as a first candidate text and an action corresponding thereto is referred to as a first action. A candidate text with the highest priority in the recognition result after reprioritizing is referred to as a second candidate text and an action corresponding thereto is referred to as a second action.

The controller 130 attempts to perform the second action (1080).

To attempt to perform the second action, the controller 130 may generate an action signal for performing the second action and transmit the generated action signal to a subject performing the second action. To distinguish action signals, an action signal for performing the first action may be referred to as a first action signal, and the action signal for performing the second action may be referred to as a second action signal.

When a subject receiving the second action signal may perform an operation corresponding to the second action signal, i.e., the second action (Yes in operation 1090), a success signal may be transmitted to the dialogue system 100.

Referring to FIG. 8, the dialogue system 100 receiving the success signal may generate a guide signal for providing the user with information about the second action (1100), and transmit the generated guide signal to a user terminal (1110).

The guide signal may be an audible guide signal or a visual guide signal, which is described later.

When a user response approving a performance of the second action is received from the user (Yes in operation 1120), the second action is performed (1130). For example, the controller 130 may transmit the second action signal to a subject performing the second action. However, because the corresponding subject has already received the second action signal, a trigger signal that triggers the performance of the second action may also be transmitted.

Meanwhile, when the second action is not performable (No in operation 1090), an action corresponding to a candidate text with a second highest priority may be attempted to perform. Alternatively, priorities may be readjusted considering factors different from factors considered before. Alternatively, a request to make an utterance again may be made to the user.

Referring to the examples of FIGS. 9 and 10, because a candidate text with a highest priority after reprioritizing is "play BTS's dynamite", the understanding module 120 may determine an action corresponding to the user's speech as playback of a song named "dynamite" of a singer named "BTS". Here, an intent and an entity may be defined as [music, playback] and [singer: BTS, song name: dynamite], respectively.

To attempt to perform the determined action, the controller 130 may request the external server 300 for playback of "dynamite" by "BTS".

The external server 300 receiving the request for playback of "dynamite" by "BTS" may search for a song named "dynamite" of a singer named "BTS".

When "dynamite" by "BTS" is successfully retrieved and determined as playable, the external server 300 may transmit a success signal to the dialogue system 100.

The controller 130 may generate a guide signal for providing information about the second action, i.e., guide signal for confirming the user whether to play "dynamite" by "BTS", and transmit the generated guide signal to the vehicle 200 through the communicator 140.

Figure 11:
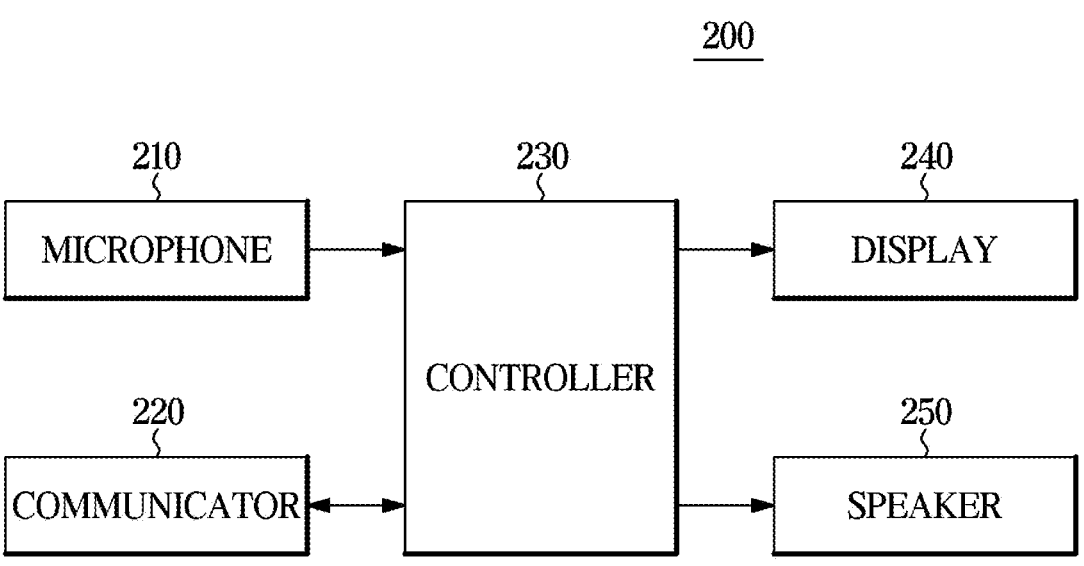
FIG. 11 is a block diagram illustrating a vehicle according to an embodiment.
Figure 12:
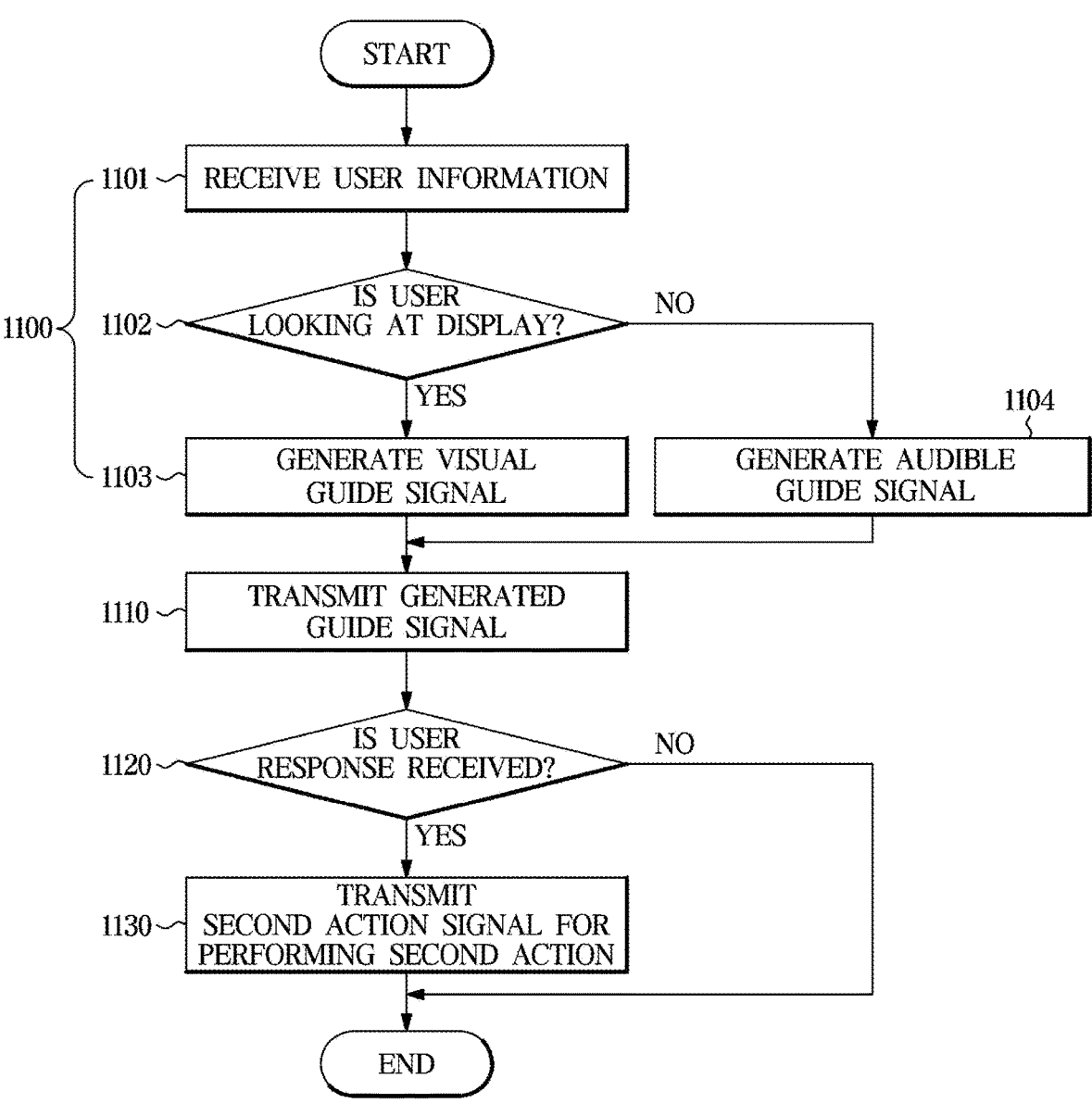
FIG. 12 is a flowchart illustrating operations of providing a user with a visual guide signal or an audible guide signal, in a dialogue processing method according to an embodiment.

FIG. 11 is a block diagram illustrating a vehicle according to an embodiment. FIG. 12 is a flowchart illustrating operations of providing a user with a visual guide signal or an audible guide signal, in a dialogue processing method according to an embodiment.

Referring to FIG. 11, the vehicle 200 includes a microphone 210 to which a user's speech is input, a communicator 220 transmitting and receiving a signal with the dialogue system 100 or the external server 300, a controller 230 performing overall control of the vehicle 200, a display 240 displaying information received from the dialogue system 100, and a speaker 250 outputting information received from the dialogue system 100.

The communicator 220 may use various wireless communication methods to transmit and receive information with the dialogue system 100 or the external server 300. For example, the communicator 220 may employ at least one of various wireless communication methods such as 3G (WCDMA/HSDPA/wibro), 4G (LTE/LTE-A), 5G, Wi-Fi, and the like.

Also, the communicator 220 may employ Bluetooth, NFC, or wired communication method using a cable to communicate with a mobile device located inside or adjacent to the vehicle 200.

The display 240 and the speaker 250 may output information received from the dialogue system 100, and content or information provided from the external server 300.

Referring to FIG. 12, the dialogue system 100 may receive user information (1101). Here, the user information may be a criterion for determining a way of providing a guide signal for the second action.

For example, when a user is in the vehicle 200 and a subject transmitting and receiving a signal with the dialogue system 100 is the vehicle 200, the dialogue system 100 may receive, from the vehicle 200, information about whether the user is looking at the display 240 provided in the vehicle 200.

The vehicle 200 may obtain the user information using a variety of sensors such as a camera provided in the vehicle 200, etc.

When the user is looking at the display 240 (Yes in operation 1102), the controller 130 generates a visual guide signal for visually providing information about the second action (1103).

When the user is not looking at the display 240 (No in operation 1102), the controller 130 generates an audible guide signal for audibly providing information about the second action (1104). However, even when the user is not looking at the display 240, generation of the visual guide signal is not excluded. That is, the visual guide signal may be generated together with the audible guide signal.

The controller 130 transmits the generated guide signal to the vehicle 200 through the communicator 140 (1110).

The vehicle 200 may display the information about the second action on the display 240 or output the information about the second action through the speaker 250 according to the transmitted guide signal.

The user may input a user response about whether to perform the second action through an input device provided in the vehicle 200. A type of user response may vary depending on a way in which the guide signal for the second action is output.

For example, when the guide signal for the second action is visually output, the user response may be input through a touchscreen or a separate input device.

Alternatively, when the guide signal for the second action is audibly output, the user response may be input through the microphone 210.

Alternatively, even when the guide signal for the second action is visually output, the user response may be input through the microphone 210.

The input user response may be transmitted by the communicator 220 to the dialogue system 100.

When the user response is received (Yes in operation 1120), the controller 130 transmits the second action signal for performing the second action to the external server 300 (1130). Here, the received user response is a response approving the performance of the second action. When the response approving the performance of the second action is not received (No in operation 1120), a request to make an utterance again may be made to the user.

The external server 300 receiving the second action signal may perform the second action corresponding to the second action signal, and transmit a result to the vehicle 200 or the dialogue system 100.

Figure 13:
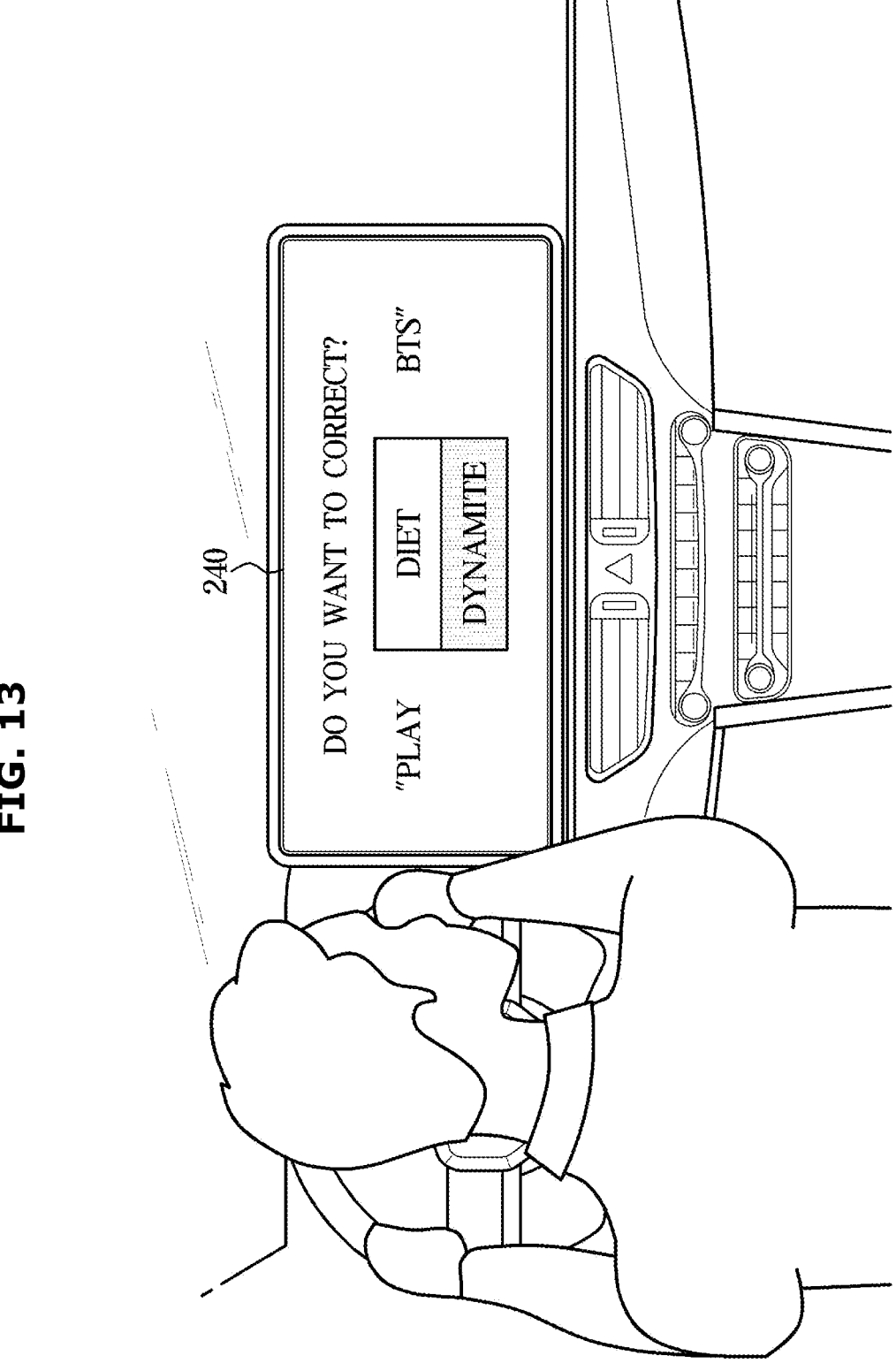
Figure 14:
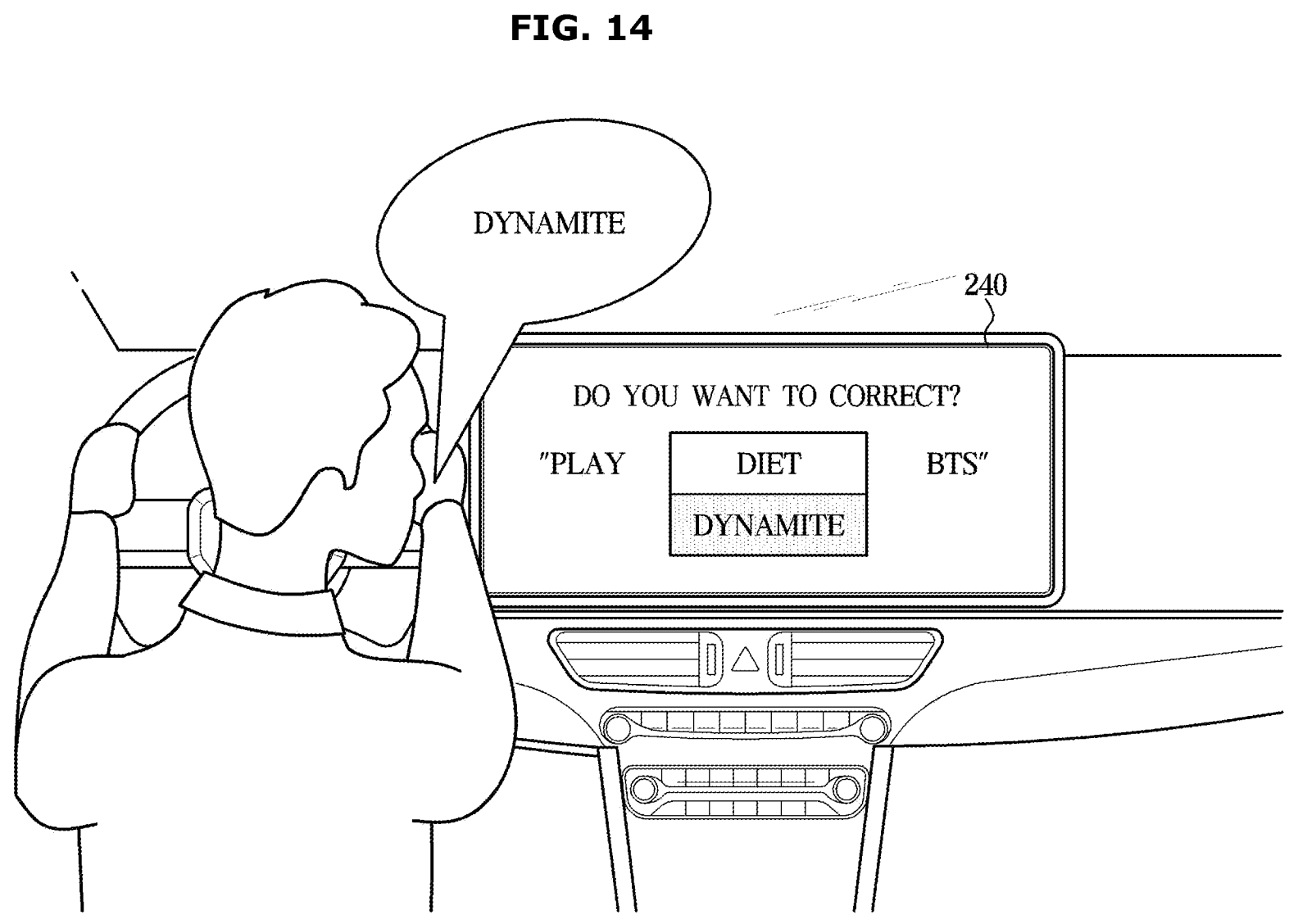
Figure 15:
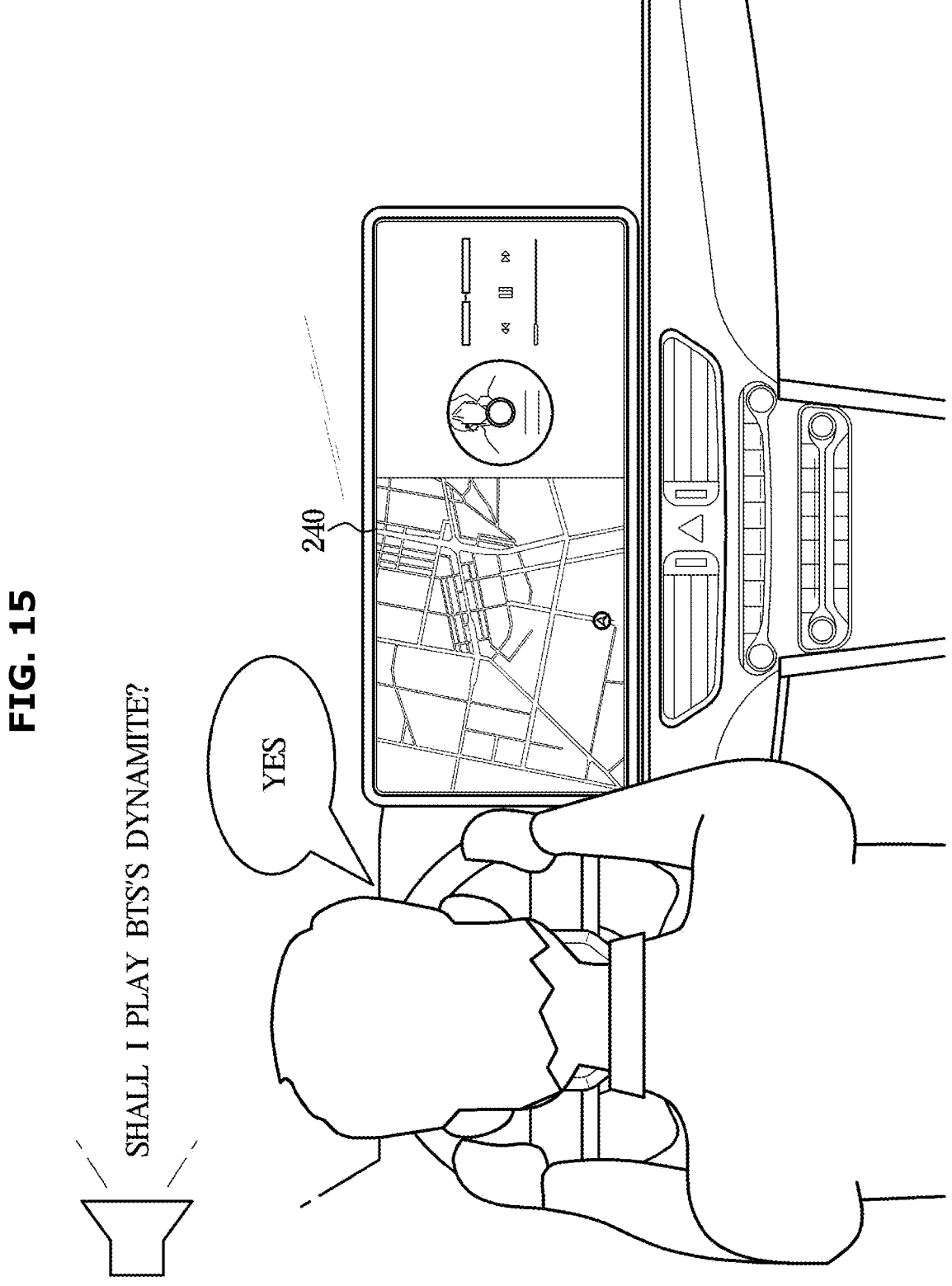

FIGS. 13 to 15 are diagrams illustrating examples of a processing procedure of a dialogue processing method according to an embodiment.

As in the above example, an example where a first candidate text is "play BTS's diet" and a second candidate text is "play BTS's dynamite" is described.

When a user is looking at the display 240, the controller 230 of the vehicle 200 may transmit user information indicating that the user is looking at the display 240, to the dialogue system 100.

The controller 130 may generate a visual guide signal for visually providing information about the second action, i.e., information about playback of "dynamite" by "BTS".

The generated visual guide signal may be transmitted to the vehicle 200 through the communicator 140, and as shown in FIG. 13, the controller 230 of the vehicle 200 may display the information about the second action on the display 240.

The information about the second action may be variously displayed. For example, as shown in FIG. 13, a message inquiring whether to correct an initially recognized first candidate text to a second candidate text may be displayed on the display 240.

Specifically, words "diet dynamite", misrecognized in the first candidate text, "play BTS's diet", and corrected in the second candidate text, "play BTS's dynamite", may be displayed.

Because the user is looking at the display 240, the user may select the corrected word "dynamite" by operating a separate input device or touching the display 240.

Alternatively, as shown in FIG. 14, by uttering the corrected word "dynamite", the user may select the second candidate text and approve the performance of the second action.

When the user is not looking at the display 240, the controller 230 of the vehicle 200 may transmit, to the dialogue system 100, user information indicating that the user is not looking at the display 240.

The controller 130 may generate an audible guide signal for audibly providing information about the second action, i.e., information about playback of "dynamite" by "BTS". The audible guide signal may be a text to speech (TTS) signal.

The generated audible guide signal may be transmitted to the vehicle 200 through the communicator 140, and as shown in FIG. 15, the controller 230 of the vehicle 200 may output the information about the second action through the speaker 250.

For example, a message inquiring whether to perform the second action such as "shall I play BTS's dynamite?" may be output.

The user may utter a user response such as "yes" or "no", and the user response received by the microphone 210 may be transmitted to the dialogue system 100 through the communicator 220.

It is illustrated in the above example that the visual guide signal or the audible guide signal is generated depending on whether the user is looking at the display 240, but the visual guide signal or the audible guide signal may be generated depending on whether the vehicle 200 is driving. For example, when the vehicle 200 is driving, the audible guide signal may be generated, and when the vehicle 200 is stopped, the visual guide signal may be generated.

Alternatively, both the visual guide signal and the audible guide signal may be generated and transmitted to the vehicle 200 by the dialogue system 100, and the visual guide signal or the audible guide signal may be output by the vehicle 200 depending on whether the user is looking at the display 240 or the vehicle 200 is driving.

The dialogue processing method according to embodiments can thus be stored in the form of a recording medium storing computer-executable instructions. The instructions may be stored in the form of a program code, and when executed by a processor, the instructions may perform operations of the disclosed embodiments. The recording medium may be implemented as a computer-readable non-transitory recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

As is apparent from the above, according to the embodiments of the disclosure, the dialogue system and the dialogue processing method can determine whether an action corresponding to a speech recognition result is performable, and when the action is not performable, determine that misrecognition occurs, and reprioritize candidate speech texts, thereby correcting an error in speech recognition.

Also, the dialogue system and the dialogue processing method can reprioritize candidate speech texts considering various factors such as a user's utterance frequency, entire users' utterance frequency, a matching rate in a domain, and completeness of sentence, and the like, thereby improving a likelihood of correction.

Also, the dialogue system and the dialogue processing method can preemptively provide a user with a speech recognition result in which an error is corrected, thereby minimizing an additional input of the user.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A dialogue system, comprising:
a speech recognizer module comprising at least one processor configured to execute a speech-to-text engine and convert a speech of a user into a plurality of candidate texts, and prioritize the plurality of candidate texts;
an understanding module in communication with the speech recognizer module, the understanding module comprising the at least one processor configured to execute a natural language understanding engine and determine a first action corresponding to a first candidate text having a highest priority from among the plurality of candidate texts;
a controller in communication with the understanding module and the speech recognizer module, the controller comprising the at least one processor configured to attempt to perform the first action as determined by the understanding module and generate a first action signal for performing the determined first action, and
a communicator configured to transmit the generated first action signal to an external server or a vehicle,
wherein if a failure signal is received from the external server or the vehicle indicating that an operation corresponding to the generated first action signal is not performable, the controller is further configured to reprioritize other candidate texts from among the plurality of candidate texts based on whether a completeness of a sentence of the speech of the user and whether an action corresponding with each of other candidate texts from among the plurality of candidate texts is performable.

2. The dialogue system of claim 1, wherein the understanding module is further configured to determine a second action corresponding to a second candidate text having a highest priority from among the reprioritized candidate texts.

3. The dialogue system of claim 2, wherein the controller is further configured to attempt to perform the determined second action, and if the second action is performable, generate a guide signal for providing the user with information about the second action.

4. The dialogue system of claim 3, wherein the controller is further configured to generate a visual guide signal for visually providing the information about the second action if the user is looking at a display.

5. The dialogue system of claim 4, wherein the controller is further configured to: generate a visual guide signal for displaying an incorrect word which is misrecognized in the first candidate text and a corrected word which is correctly recognized in the second candidate text, and
if a speech including the corrected word is input from the user, transmit a second action signal for performing the second action to the external server or the vehicle through the communicator.

6. The dialogue system of claim 3, wherein the controller is further configured to generate an audible guide signal for audibly providing the information about the second action if the user is not looking at a display.

7. The dialogue system of claim 3, wherein the controller is further configured to generate a visual guide signal for visually providing the information about the second action and an audible guide signal for audibly providing the information about the second action, and the communicator is further configured to transmit the visual guide signal and the audible guide signal to the vehicle.

8. The dialogue system of claim 1, wherein the controller is further configured to reprioritize the other candidate texts based on at least one of: an utterance frequency of the user or an utterance frequency of entire users.

9. A dialogue processing method, comprising:
converting, by at least one processor, a speech of a user into a plurality of candidate texts;
prioritizing, by the at least one processor, the plurality of candidate texts;
determining, by the at least one processor, a first action corresponding to a first candidate text having a highest priority from among the plurality of candidate texts;
attempting, by the at least one processor, to perform the determined first action;
generating, by the at least one processor, a first action signal for performing the determined first action;
transmitting, by a communicator, the generated first action signal to an external server or a vehicle; and
reprioritizing, by the at least one processor, other candidate texts of the plurality of candidate texts if the first action is not performable,
wherein, if a failure signal is received from the external server or the vehicle, the reprioritizing step further comprises reprioritizing the other candidate texts based on whether a completeness of a sentence of the speech of the user and whether an action corresponding with each of other candidate texts from among the plurality of candidate texts is performable, and
wherein the failure signal indicates that an operation corresponding to the generated first action signal is not performable.

10. The dialogue processing method of claim 9, further comprising:
determining a second action corresponding to a second candidate text with a highest priority from among the reprioritized candidate texts.

11. The dialogue processing method of claim 10, further comprising:

attempting to perform the determined second action; and generating a guide signal for providing the user with information about the second action if the second action is performable.

12. The dialogue processing method of claim 11, wherein the generating of the guide signal step further comprises generating a visual guide signal for visually providing the information about the second action if the user is looking at a display.

13. The dialogue processing method of claim 12, wherein the generating of the guide signal step further comprises generating a visual guide signal for displaying a word which is misrecognized in the first candidate text and corrected in the second candidate text, and when a speech including the corrected word is input from the user, transmitting a second action signal for performing the second action to the external server or the vehicle.

14. The dialogue processing method of claim 11, wherein the generating of the guide signal further comprises generating an audible guide signal for audibly providing the information about the second action if the user is not looking at a display.

15. The dialogue processing method of claim 11, wherein the generating of the guide signal step further comprises generating a visual guide signal for visually providing the information about the second action and an audible guide signal for audibly providing the information about the second action, and transmitting the visual guide signal and the audible guide signal to the vehicle.

16. The dialogue processing method of claim 9, wherein the reprioritizing step further comprises reprioritizing the other candidate texts based on at least one of: an utterance frequency of the user or an utterance frequency of entire users.

\* \* \* \* \*